United States Patent
Radzishevsky

(10) Patent No.: US 8,116,514 B2
(45) Date of Patent: Feb. 14, 2012

(54) WATER MARK EMBEDDING AND EXTRACTION

(76) Inventor: Alex Radzishevsky, Haifa (IL)

( * ) Notice: Subject to any disclaimer, the term of this patent is extended or adjusted under 35 U.S.C. 154(b) by 1042 days.

(21) Appl. No.: 12/068,619

(22) Filed: Feb. 8, 2008

(65) Prior Publication Data

US 2008/0263359 A1 Oct. 23, 2008

Related U.S. Application Data

(60) Provisional application No. 60/907,778, filed on Apr. 17, 2007.

(51) Int. Cl.
*G06K 9/00* (2006.01)
*H04L 9/32* (2006.01)

(52) U.S. Cl. .................. 382/100; 713/176

(58) Field of Classification Search ........... 382/100, 382/232, 240; 380/51, 54, 210, 252, 287, 380/44, 277; 370/522–527; 283/72, 74–81, 283/85, 93, 101; 348/461, 463; 713/176, 713/179; 358/3.28

See application file for complete search history.

(56) References Cited

U.S. PATENT DOCUMENTS

| 5,822,432 A * | 10/1998 | Moskowitz et al. ............ 380/28 |
| 6,674,861 B1 * | 1/2004 | Xu et al. ........................ 380/252 |
| 7,043,684 B2 * | 5/2006 | Joly ................................ 714/814 |
| 7,707,422 B2 * | 4/2010 | Shin et al. ..................... 713/176 |
| 7,886,152 B2 * | 2/2011 | Neubauer et al. ............. 713/176 |
| 2002/0094082 A1 | 7/2002 | Jones et al. |
| 2005/0166068 A1 | 7/2005 | Lemma et al. |

FOREIGN PATENT DOCUMENTS

WO  WO 2005/034398   5/2005

* cited by examiner

*Primary Examiner* — Abolfazl Tabatabai

(57) ABSTRACT

A watermarking key consisting of a sequence of elements is embedded into a data sequence. Each element may take on two or more values. In order to embed a watermarking key, first a reference sequence is divided into blocks. Each element of the watermarking key is associated with a respective block of the reference sequence. A watermarked sequence is then generated by shifting the associated blocks by a degree determined by the value of the respective associated element of the watermarking key.

32 Claims, 7 Drawing Sheets

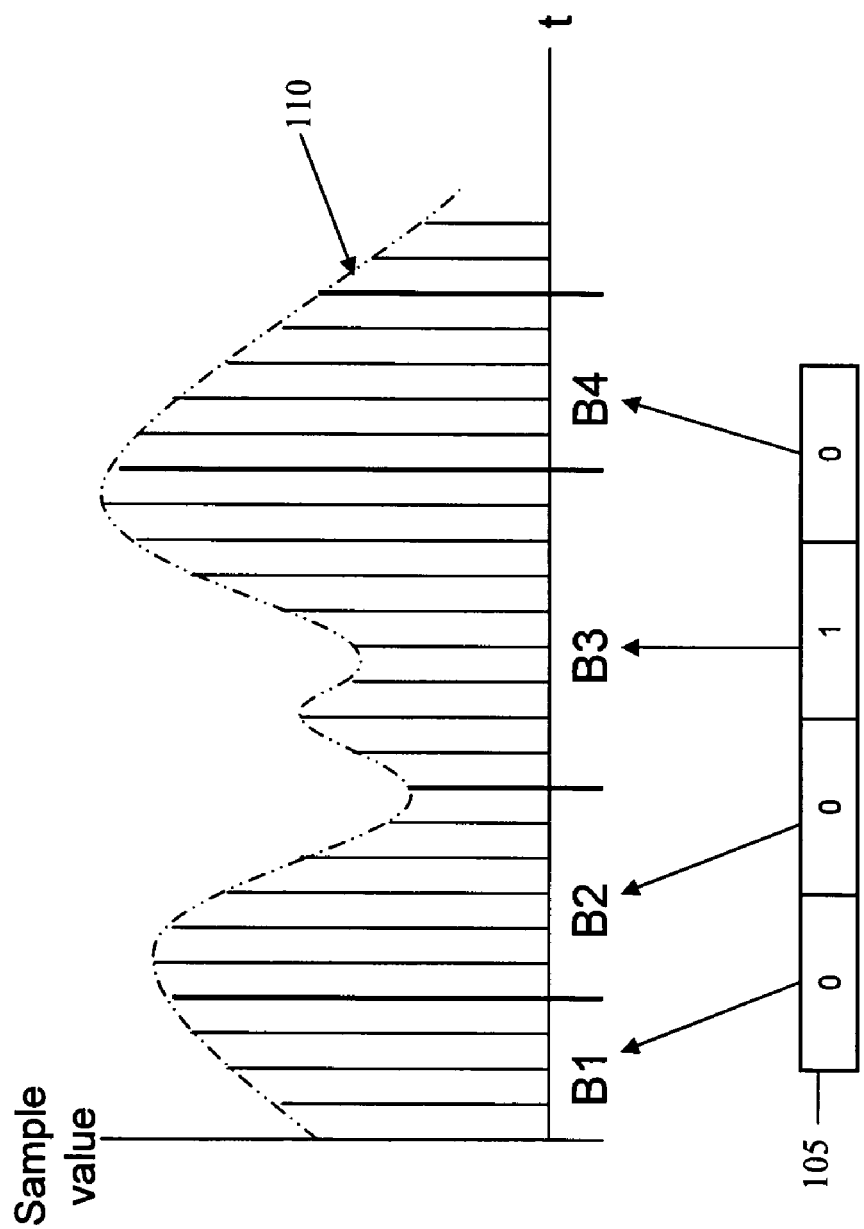

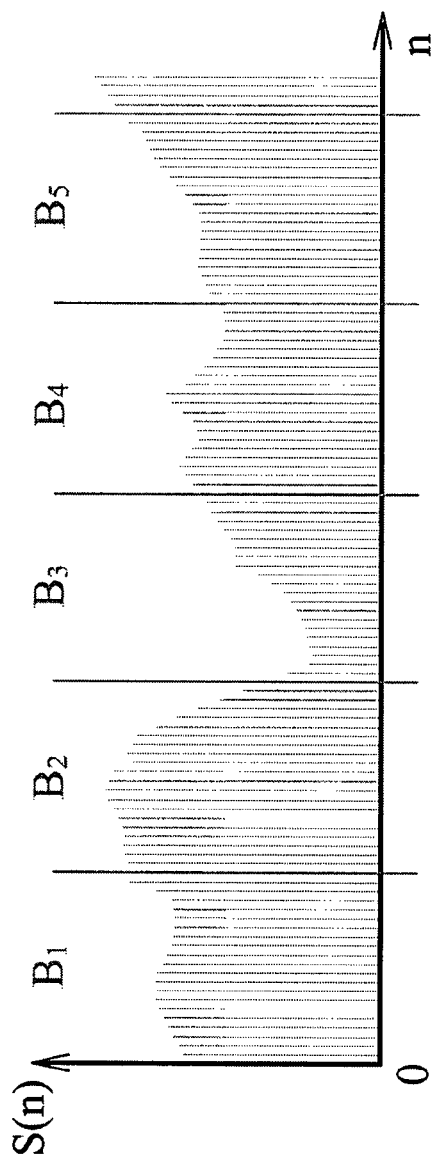
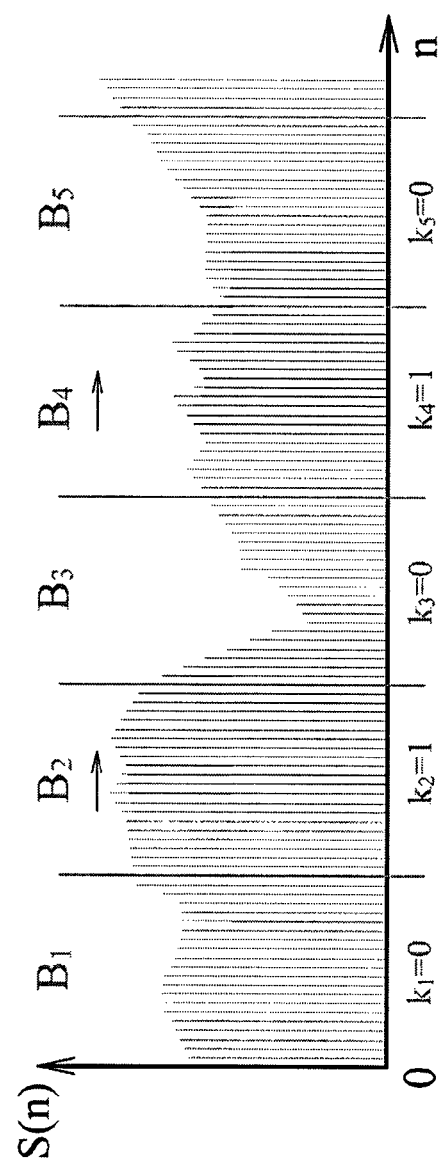
Figure 3a
Figure 3b

WATER MARK EMBEDDING AND EXTRACTION

RELATED APPLICATION/S

This application claims the benefit of U.S. Provisional Patent Application No. 60/907,778, filed Apr. 17, 2007, which is herein incorporated in its entirety by reference.

FIELD AND BACKGROUND OF THE INVENTION

The present invention, in some embodiments thereof, relates to a method and system for watermarking a data sequence, and, more particularly, but not exclusively, to a method for watermarking data sequences of media content.

Recent developments in the field of digital audio and video have raised the problems of copyright protection and of monitoring the distribution of digital copies of audio and video content. Digital watermarking offers a solution to both copyright issues and to monitoring problems. Watermarking embeds a signature into the original data. The signature enables the owner to identify whether a given copy of the content is a legitimate copy. It is generally desired that the watermark be imperceptible to the user, particularly for audio and video content. The watermark should also be undetectable by non-owners in order to prevent duplication, and resistant enough to be reliably extracted from the copy even after the original data is transformed by operations such as transcoding, transducing, cropping, effects processing, equalization and so forth.

Data conversion techniques, such as multiple low bit-rate transcoding between different digital data formats and transducing, may have a strong impact on performance and robustness of existing watermarking schemes. A problem resulting from the sensitivity to data conversion is the difficulty of controlling audio recordings shared and transmitted via the Internet, or reproduced from radio channels, and other public media. For example, a broadcast signal, such as a song, may be recorded from the radio, transformed into digital form and distributed illegally. Ultimately, transcoded several times, transduced and transformed (with reverberation, echo, etc. applied), the watermark data may become unextractable.

While a number of audio watermarking schemes provide good robustness to transcoding based on psycho-acoustical models, audio signal transducing or effects processing remains a serious problem. Conversion of the audio data into an analog signal and the reproduction and subsequent conversion of the analog signal back to the digital form often destroys the watermarked data, making the watermark partially or completely unextractable.

U.S. Pat. Appl. 2001/0036292 by Levy et al. presents an autocorrelation-based watermarking technique, in which the based watermark is embedded by taking a copy of the image, lowering its level, and adding it slightly offset to the original image.

U.S. Pat. No. 6,999,598 by Foote et al. presents systems and methods for watermarking an original data by selectively dimensionally compressing or expanding a size of each of some or all of the portions along the given dimension, according to a given encoding scheme.

SUMMARY OF THE INVENTION

The present embodiments present a digital watermarking scheme, in which the watermark may be embedded in the data in real-time or during post-processing encoding.

In the present embodiments, a reference sequence is divided into blocks. The reference sequence is watermarked using a watermarking key. The watermarking key consists of a predetermined sequence of elements, typically a sequence of bits.

Each element (e.g. bit) of the watermarking key is associated with a respective block of the reference sequence. The reference sequence is watermarked by shifting blocks of the reference sequence forwards or backwards in the data sequence. The direction and degree of the shift for each block is determined by the value of the associated element of the watermarking key, in accordance with an established rule. The shift may be performed in time and/or in space, in accordance with the type of data being watermarked. For example, when watermarking an audio data sequence the shift may be performed in the time dimension, whereas with image data the shift may be performed in a spatial direction.

In order to extract the watermark from a watermarked sequence, corresponding blocks of a reference sequence and the watermarked sequence are compared to determine the offset between corresponding pairs of blocks. Since the rules used to perform the watermarking (denoted herein the offset rules) are known, the offset between corresponding blocks determines the value of the respective element of the watermarking key.

According to an aspect of some embodiments of the present invention there is provided a method for embedding a watermarking key into sequential data, including:

apportioning a reference sequence into blocks;

associating elements of the watermarking key with respective blocks of the reference sequence; and generating a watermarked sequence from the reference sequence using a watermarking key, wherein the watermarking key comprises a specified sequence of elements and wherein each of the elements takes a value, by shifting the respective blocks by a degree determined in accordance with a value of the respective associated element of the watermarking key.

According to some embodiments of the invention, wherein associating elements of the watermarking key with respective blocks of the reference sequence and generating a watermarked sequence by shifting the associated blocks are performed for a non-consecutive set of blocks.

According to some embodiments of the invention, apportioning a reference sequence into blocks is performed in accordance with block division rules specifying the division of the reference sequence into the blocks.

According to some embodiments of the invention, the method for embedding a watermarking key further includes: analyzing the reference sequence to identify occurrences of a specified feature, and specifying respective lengths for the blocks in accordance with the occurrences.

According to some embodiments of the invention, the method for embedding a watermarking key further includes adjusting a magnitude of overlapping samples of the watermarked sequence.

According to some embodiments of the invention, the method for embedding a watermarking key further includes obtaining the reference signal by sampling an analog source signal.

According to some embodiments of the invention, the method for embedding a watermarking key further includes: separating a source signal by frequency band into a plurality of sub-band signals, and sampling one of the sub-band signals to obtain the reference sequence.

According to some embodiments of the invention, the method for embedding a watermarking key further includes:

separating a source data sequence into a plurality of channel sequences, and selecting one of the channel sequences as the reference sequence.

According to some embodiments of the invention, the method for embedding a watermarking key further includes separating the reference sequence by frequency band into a plurality of reference channel sub-band signals, wherein the watermarking key is embedded into a selected one of the reference channel sub-band signals.

According to some embodiments of the invention, the method for embedding a watermarking key further includes processing the reference sequence and a second one of the channel sequences to increase the similarity of the reference and the second channel sequences in a selected frequency sub-band.

According to an aspect of some embodiments of the present invention there is provided a watermarking apparatus for embedding a watermarking key into a sequential data, which includes:
- a reference sequence divider, configured for apportioning a reference sequence into blocks;
- an element associator associated with the reference sequence divider, configured for associating elements of the watermarking key with respective blocks of the reference sequence, wherein the watermarking key comprises a specified sequence of elements and wherein each of the elements takes a value; and
- an embedding unit associated with the element associator, configured for generating a watermarked sequence boy shifting the associated blocks by a degree determined in accordance with a value of the respective associated element of the watermarking key, thereby to embed the watermarking key into the reference sequence.

According to some embodiments of the invention, the watermarking apparatus further includes a database associated with the embedding unit, configured for storing a watermarking protocol.

According to some embodiments of the invention, the watermarking apparatus further includes an original signal processor associated with the reference sequence divider, and configured for sampling a source signal and processing the samples into the reference sequence.

According to some embodiments of the invention, the watermarking key is embedded into the reference sequence based on a watermarking protocol which includes at least one of:
 i. Block division rules for defining a manner for dividing the reference sequence into blocks,
 ii. Offset rules for defining a manner for assigning degrees of shift degrees to watermarking key elements,
 iii. Edge adjustment rules for defining a manner for adjusting magnitudes of overlapping samples of a watermarked sequence, and
 iv. Assignment rules for defining a manner for assigning elements of the watermarking key to reference sequence blocks.

According to some embodiments of the invention, the reference sequence is a media signal.

According to some embodiments of the invention, the reference sequence is one of: an audio signal, an image, a sequence of images and a video signal.

According to some embodiments of the invention, the degree of shift for a block is selected in accordance with a value of the respective associated element.

According to some embodiments of the invention, the reference sequence is obtained from a communication device.

According to some embodiments of the invention, the reference sequence is obtained from a data signal processor.

According to some embodiments of the invention, the reference sequence is obtained from a media data file.

According to an aspect of some embodiments of the present invention there is provided a method for extracting a watermark from a watermarked sequence, which includes: associating each of a sequence of watermarked blocks with respective blocks of a reference sequence, obtaining a sequence of offsets by determining, for each of a set of watermarked blocks, an offset between the watermarked block and the respective reference sequence block, and translating the sequence of offsets into a watermarking key.

According to some embodiments of the invention, determining an offset between a watermarked block and a reference sequence block includes identifying an offset which yields a peak cross-correlation between the watermarked block and the reference sequence block.

According to some embodiments of the invention, determining an offset between a watermarked block and the respective reference sequence block includes: locating a signal feature within the watermarked block, locating a corresponding signal feature within the respective reference sequence block, and calculating an offset between the locations.

According to some embodiments of the invention, the method for extracting a watermark further includes: separating a source data sequence into a plurality of channel sequences, and selecting one of the channel sequences as the reference sequence.

According to some embodiments of the invention, the method for extracting a watermark further includes: separating a source signal by frequency band into a plurality of sub-band signals, and sampling one of the sub-band signals to obtain the reference sequence.

According to some embodiments of the invention, the method for extracting a watermark further includes synchronizing the watermarked sequence and the reference sequence.

According to some embodiments of the invention, translating is performed by, for each offset within the sequence, determining a value of a corresponding element of the watermarking key in accordance with a magnitude of the offset.

According to some embodiments of the invention, the method for extracting a watermark further includes determining an authenticity of the watermarked sequence by comparing the extracted watermarking key to an original watermarking key.

According to an aspect of some embodiments of the present invention there is provided a watermark extraction unit for extracting a watermarking key from a watermarked sequence, including:
- a watermarked sequence divider, configured for apportioning a watermarked sequence into watermarked blocks corresponding to respective blocks of a reference sequence,
- an offset determiner associated with the watermarked sequence divider, configured for obtaining a sequence of offsets by determining, for each of a set of watermarked blocks, an offset between the watermarked block and the respective reference sequence block, and
- a translation unit associated with the offset determiner, configured for translating the sequence of offsets into the watermarking key.

According to some embodiments of the invention, the watermark extraction unit further includes an authentication unit associated with the offset determiner, configured for determining an authenticity of the watermarked sequence by comparing the extracted watermarking key to an original watermarking key.

According to some embodiments of the invention, the watermarking key is extracted from the reference sequence based on a watermarking protocol which includes at least one of:

i. Block division rules for defining a manner for dividing the reference sequence into blocks,
ii. Offset rules for defining a manner for assigning degrees of shift degrees to watermarking key elements,
iii. Edge adjustment rules for defining a manner for adjusting magnitudes of overlapping samples of a watermarked sequence, and
iv. Assignment rules for defining a manner for assigning elements of the watermarking key to reference sequence blocks.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1a shows a four-bit watermarking key and a reference sequence to be watermarked;

FIG. 3a is a reference sequence divided into block prior to watermarking;

FIG. 3b is a resultant watermarked sequence;

DESCRIPTION OF THE PREFERRED EMBODIMENTS

Figure 1B:
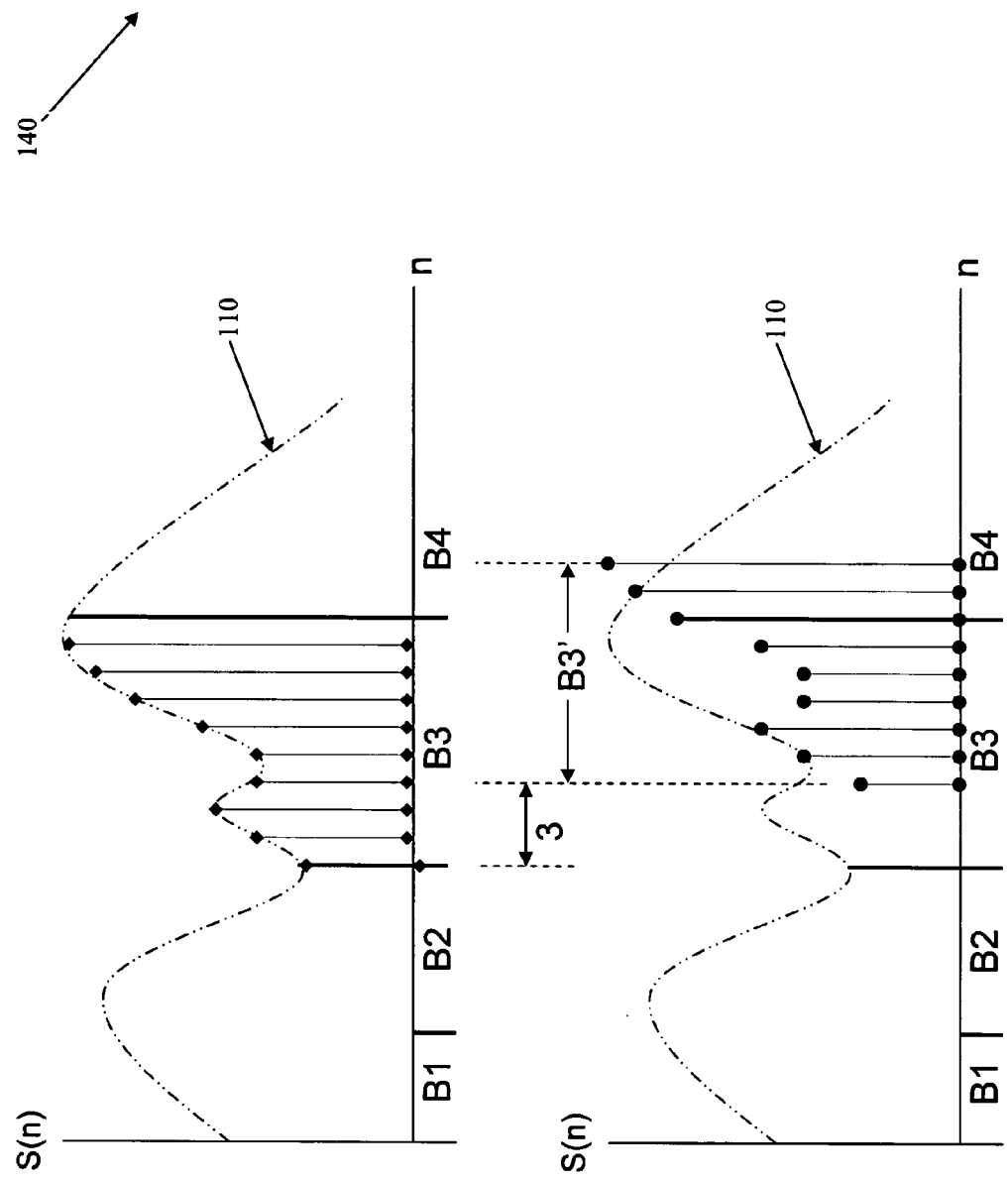
FIG. 1b shows a block of the reference sequence and a corresponding shifted block.

The present invention, in some embodiments thereof, relates to a method and system for watermarking a data sequence, and, more particularly, but not exclusively, to a method for watermarking sequences of media content.

The watermark extracted from watermarked sequence may be compared to the original watermarking key, in order to determine the authenticity of the target data. In alternate embodiments, the watermark is unique for each watermarked data sequence or signal, or even for each copy of the same signal.

Implementations of the present embodiments may be designed to be imperceptible to the user. The present watermarking embodiments are also typically robust to transcoding, transducing and other types of data conversion such as A/D and D/A conversion, sample rate conversion, re-quantization, lossy compression, and effects processing.

The embodiments presented below enable both strict and blind watermarking. In strict watermarking, the unmodified source data is needed to extract watermark from the watermarked signal. In blind watermarking, source data is not required for watermark extraction.

Some embodiments presented below implement a watermarking scheme using a binary watermarking key. Simple rules are applied for separating the signal into blocks and determining shifts. However the method may be generalized to other embodiments, through the use of higher-order watermarking keys (i.e. a watermarking key where each element of the watermarking key may take more than two values), different ways of apportioning a signal into blocks, non-uniform shifts, embedding the watermark into non-consecutive blocks of the reference sequence and so forth.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIGS. 1a-1b illustrate the principles described above. FIG. 1a shows watermarking key 105 consisting of four bits, 0010, and source data comprising a sequence of samples of a source signal 110. The samples are divided into four blocks, B1-B2-B3-B4. Each block is associated with a different bit of watermarking key 105. As seen in the FIG. 1a, block B3 is associated with the third bit of watermarking key 105, which has a value of '1'.

Consider a situation in which a '1' at the third bit of the watermarking key dictates a shift of three samples to the right. FIG. 1b shows the relationship between the samples of block B3 and a corresponding shifted block B3', which has been shifted three samples to the right.

During the extraction process, the watermarked sequence is checked against the un-watermarked reference sequence. For example, in order to extract the third bit of the watermark key, Block B3 and shifted block B3' are analyzed to determine the amount of shift between them. Assume that it is correctly determined that the shift is three samples to the right. Based on the offset rules used to watermark the original signal, it is known that a shift of block B3 three samples to the right indicates that the associated bit of watermarking key 105 is a '1'.

This analysis is repeated for each block of a source signal 110, thereby extracting the watermarking key.

In FIGS. 1a and 1b, no modification or distortion has occurred to the shifted block of samples B3'. However, standard processing operations, such as transducing, compression, and the like, may introduce differences between the original and target signals, even when the target signal is a legitimate copy of the original signal. Exemplary embodiments presented below provide a method for extracting a watermarking key, even after such differences have been introduced.

While watermarking is commonly performed on media signals, such as audio, video, images and sequences of images, the embodiments presented below are not limited to media signals. Furthermore, the same principles may be implemented on an uncompressed data sequence and on compressed and/or encoded data sequence, including data having a block structure such as MPEG-1 Layer 3 audio streams (known as MP3) and similar formats.

Figure 2:
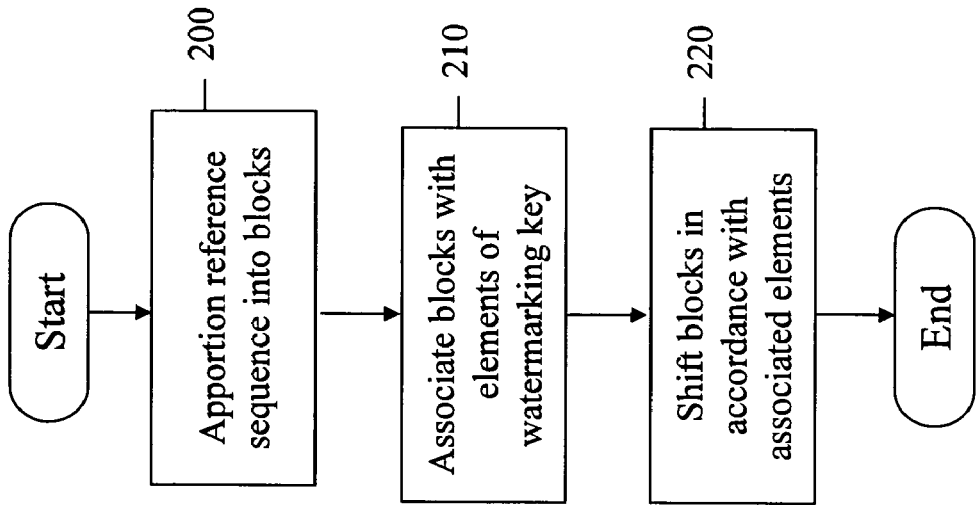
FIG. 2 is a simplified flowchart of a method for watermarking data, according to a preferred embodiment of the present invention.

Reference is now made to FIG. 2, which is a simplified flowchart of a method for watermarking data, according to a preferred embodiment of the present invention.

The present embodiment embeds a specified watermark into sequential data. The watermarking key K is a sequence of p elements:

$$K=\{k_1, k_2, \ldots, k_p\}.$$

Each element of the watermarking key may take on one of a discrete set of values $\{v_1, v_2, \ldots, v_n\}$.

In the following description the sequential data is referred to as a sequence of samples. These sample denote the components of the reference sequence, and are not limited to data obtained by sampling an analog source signal.

In 200 the reference sequence, S, is apportioned into p blocks:

$$S=\{B_1, B_2, \ldots, B_p\}.$$

In a first preferred embodiment, the block lengths are uniform. Each block is of equal length.

In a second preferred embodiment, block lengths may vary. A set of block division rules, W, specifies the length of each block:

$$W=\{w_1, w_2, \ldots, w_p\}$$

where $w_i$, $1 \leq i \leq p$, is the length of the i-th block of the sequence.

In a third preferred embodiment, block lengths are not predetermined. An analysis of the reference sequence is performed to determine block lengths individually for the particular reference sequence. For example, the reference sequence and/or original signal may be analyzed to identify a certain feature or features, which serve to position the block edges. Thus, for an audio signal the block edges may be positioned on pauses between words of a voiced signal or on intervals of low energy.

Selecting block lengths based on the signal characteristics may result in less perceptible distortions in the watermarked signal than a simpler, predetermined scheme such as dividing the reference sequence into fixed length blocks.

In 210, the elements of the watermarking key are associated with respective blocks of the reference sequence. In one embodiment, the elements are associated to consecutive reference sequence blocks. In other embodiments the elements are not associated consecutively, but rather to a selected set of blocks. For example, the watermarking key elements may be associated with every other block. Non-sequential association may reduce the distortions in the watermarked sequence, by leaving portions of the sequence unaffected by the watermarking. It may also make the watermark more difficult for non-owners to identify, duplicate, change or destroy.

In a further embodiment, the watermarking key sequence is encoded using error correction algorithms, which may ensure better watermarking robustness.

In 220, a watermarked sequence is generated by shifting each of the reference sequence blocks by a degree determined from the value of the associated element of the watermarking key. Note that the degree of shift defines both a magnitude and direction of shift. The shifts may be specified by a set of offset rules.

In a first embodiment, a constant degree of shift is assigned to each possible value of the watermarking key elements. For example, the value $v_1$ may specify a shift of 500 samples to the right, whereas the value $v_2$ may specify a shift of 100 samples to the left.

In a second preferred embodiment, the degree of shift assigned to each potential value varies according to a given rule or function. For example, the shift may vary based on the position of the element in the watermarking key sequence.

In another embodiment, the reference sequence and/or the source signal from which the reference sequence was generated are analyzed to determine the degrees of shift.

The degrees of shift may be selected to obtain a desired level of imperceptibility (typically to a human viewer or listener), and/or robustness. Generally speaking, there is often a trade-off between watermark robustness and imperceptibility. Robust watermarking generally requires using larger shift values, as the larger the shift, the easier it typically is to extract the watermark from the watermarked sequence. At the same time, imperceptibility requirements generally limit shift degrees, as large shifts may lead to perceptible audio quality degradation.

One approach is to try different shift values, and to check the resulting quality of the watermarked sequence using methods such as waveform estimations, spectrum estimations, etc.

Another approach for finding an optimal degree of shift is based on psychoacoustical analysis which may be performed on an audio signal to determine shift degrees which provide a less perceptible signal quality degradation and good robustness.

The watermarking process begins with an un-watermarked reference sequence. Exemplary embodiments for obtaining the reference sequence include:

I. The reference sequence is provided, and does not require any further processing before being watermarked.

II. A multi-channel source data sequence is provided. The source data signal is separated into channels (for example right and left channels of a stereo audio signal). One (or several) of these channels is selected as the reference sequence. After the watermark is embedded into the selected channel (or channels), the channels are re-combined to form the watermarked sequence. Watermarking of multichannel data may allow improved imperceptibility and/or robustness.

In a further embodiment, watermarking is performed on one or more selected frequency bands (denoted "carrier bands") of the reference channel. In an exemplary embodiment, two of the source data channels are chosen. One of these chosen channels is selected to be the reference channel (the other channel is not watermarked, and is used as a source signal during the watermark extraction process). The reference channel is separated into two or more frequency sub-bands. One or more of these frequency sub-bands are defined as carrier bands. The watermark is embedded into the carrier band(s) of the reference channel. The wideband channel data is then synthesized back from the sub-band signals. In the synthesized wideband channel data, the reference channel contains watermarked carrier band(s), and the other chosen channel contains unmodified carrier band(s). Finally, the channels are re-combined to form the watermarked sequence.

In yet a further embodiment, prior to watermarking, corresponding carrier band signals of both chosen channels are processed to make them equal or similar (for example by averaging or mixing). Increasing the similarity of the chosen channels may greatly improve, or may even be required to provide good reliability of the watermark extraction. First, the second (un-watermarked) chosen channel is separated into frequency sub-bands, similarly to the reference channel. After the carrier band processing, the wideband un-watermarked signal is synthesized back from the sub-band signals (including the modified carrier band signals).

III. The reference sequence is obtained by sampling (or otherwise processing) an analog source signal into a data sequence.

IV. An analog source signal is provided. The source signal is sampled and then split into frequency bands, resulting in multiple sub-band signals. Then the sub-band signals are processed similarly to II, and pairs of sub-bands are selected as carrier bands. One of the carrier bands of each pair is selected as a reference sequence. After the watermark is embedded into the reference carrier band sequence, the sub-band sequences are combined into the watermarked sequence by synthesis from the sub-band components.

In a further embodiment, the pair of carrier band signals is processed to make the bands more similar, for example by averaging or mixing the carrier band signals, prior to watermarking the pair's reference sequence.

Preferably the carrier bands are selected at frequency ranges which are less perceptible to the human ear. It has been determined that the human ear can distinguish phase differences at frequencies below 1 KHz. Therefore the carrier bands are preferably selected at frequencies greater than 1 KHz.

Embodiments II and IV are appropriate even for sequences in which the degree of similarity amongst the different channels or sub-band signals is low.

Additional embodiments deal with issue of sample magnitudes at the block edges. Shifting a block of samples may cause the samples of different blocks to overlap.

In a first embodiment no adjustment is performed on the block edges. Samples shifted into another block "overwrite" the original sample magnitudes. Sample values for samples that were "shifted out" of the block may be synthesized by sample repetition, or utilizing artificial synthesis techniques such as Packet Loss Concealment and so forth.

If a block of an audio signal is shifted without adjustment at the block edges, the transition may be heard as a click or pop. To remove this effect, smoothing may be performed on the block edges, for example by fade in/out of samples on the edges of adjacent blocks.

In another embodiment the magnitudes of overlapping samples are adjusted according to specified edge adjustment rules. The adjustment is preferably made to make the difference between the original signal and the watermarked signal inaudible.

One example of edge adjustment is averaging the overlapping samples. Alternately, the transition between the blocks may be based on psychoacoustic analysis of the signal, for example by adjusting sample values according to time and/or frequency masking properties of the human ear.

An exemplary embodiment of a method for watermarking a reference sequence with a binary watermarking key based on the principles described above is now presented.

Consider a reference sequence S consisting of n consequent samples $s_i$, i=1, 2, ..., n:

$$S=\{s_1, s_2, \ldots, s_n\}. \quad (1)$$

The reference sequence S is watermarked with a binary watermarking key K, consisting of p bits $k_i$, p>2:

$$K=\{k_1, k_2, \ldots, k_p\} \quad (2)$$

where $k_i$ designates i-th bit of the watermarking key K, and $k_i$ can be 0 or 1.

The samples are divided into p blocks:

$$S=\{B_1, B_2, \ldots, B_p\} \quad (3)$$

Each block $B_i$ for i=1, 2, ..., p is $w_i$ samples long, according to block division rules:

$$W=\{w_1, w_2, \ldots, w_p\} \quad (4)$$

where $w_k$ designates k-th block of the sequence S. Thus:

$$S=\{B_1, B_2, \ldots, B_p\}=\{\{s_1, s_2, \ldots, s_{w_1}\}, \{s_{w_1+1}, s_{w_1+2}, \ldots, s_{w_1 w_2}\}, \ldots\} \quad (5).$$

For simplicity we assume that each block $B_i$ for i=1, 2, ..., p is w samples long, i.e. $w_1, w_2, \ldots, w_p$=w. Thus:

$$S=\{B_1, B_2, \ldots, B_p\}=\{\{s_1, s_2, \ldots, s_w\}, \{s_{w+1}, s_{w+2}, \ldots, s_{2w}\}, \{s_{2w+1}, s_{2w+2}, \ldots, s_{3w}\}, \ldots\}. \quad (6)$$

The watermark K is embedded into signal S by shifting each block $B_i$, in accordance with the value of the corresponding bit $k_i$ of the watermarking key K.

In the present example, the offset rules specify that:
if $k_i$=1, shift block $B_i$ by $L_i$ samples left,
if $k_i$=0, shift block $B_i$ by $R_i$ samples right,
where L=$\{L_1, L_2, \ldots, L_p\}$ and R=$\{R_1, R_2, \ldots, R_p\}$ are specified sets of sample offsets for the corresponding blocks of the set B, with $0 \leq L_i, R_i < w_i$.

A simple example of such offset rules may specify that $L_i$=L and $R_i$=0 for all i and for a fixed positive L.

Reference is now made to FIGS. 3a and 3b which show embedding a watermark key K=$\{0,1,0,1,0\}$ into a reference sequence S(n). FIG. 3a shows S(n) prior to watermarking, with S(n) divided into a set of blocks $\{B_1, B_2, B_3, B_4, B_5\}$ of equal lengths.

For simplicity we define that $L_i=7$ and $R_i=0$, regardless of the value of i. Thus the offset rules specify that for all blocks:

if $k_i=1$, block $B_i$ is shifted seven samples left, and if $k_i=0$, block $B_i$ is not shifted.

The result is the watermarked sequence shown in FIG. 3b.

Figure 4:
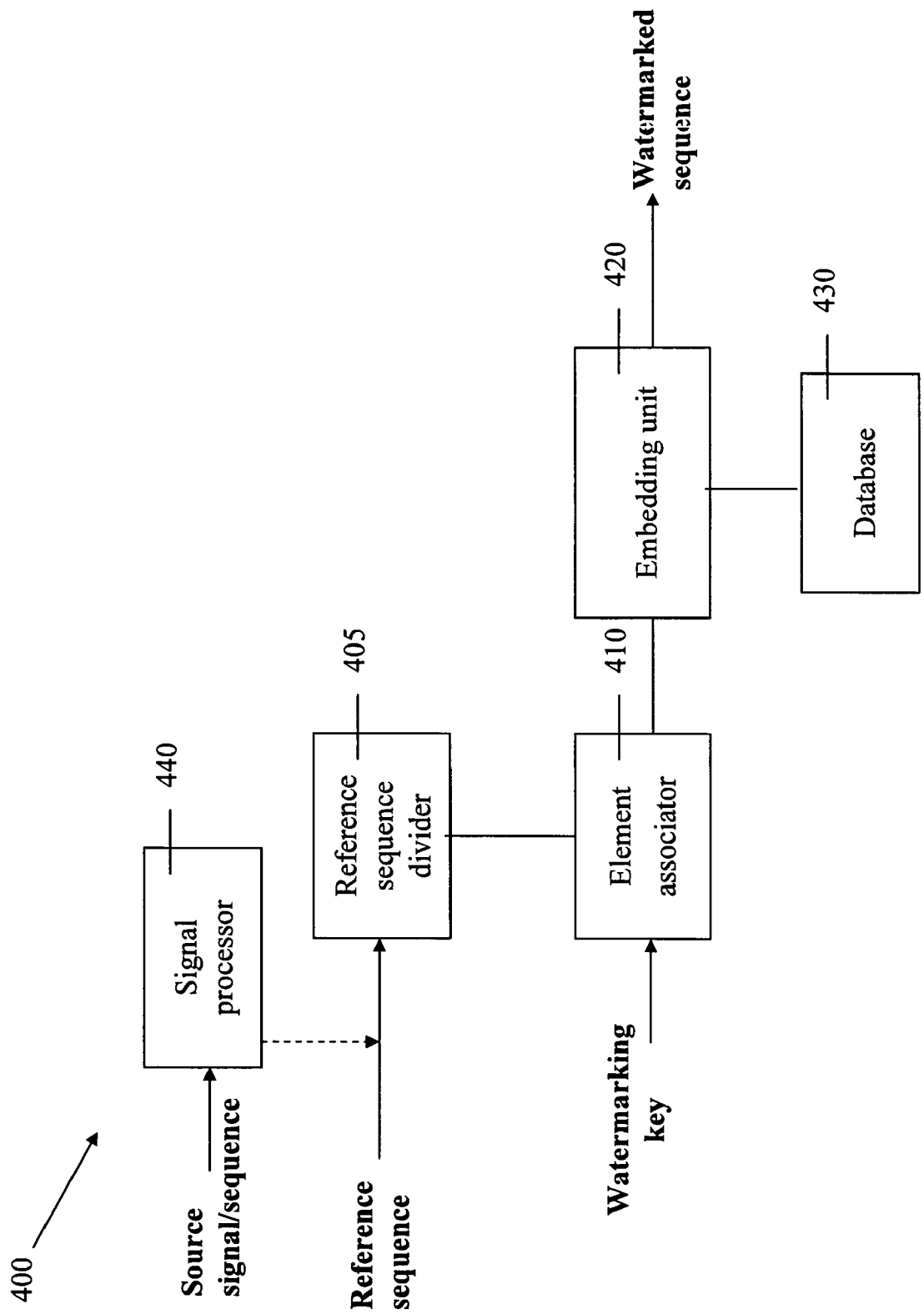
FIG. 4 is a simplified block diagram of a watermarking apparatus for embedding a watermark into a reference sequence, according to a preferred embodiment of the present invention.

Reference is now made to FIG. 4, which is a simplified block diagram of a watermarking apparatus for embedding a watermark into a reference sequence, according to a preferred embodiment of the present invention. Watermarking apparatus 400 includes a reference sequence divider 405, an element associator 410 and an embedding unit 420.

Reference sequence divider 405 apportions a reference sequence into blocks. The block edges may be positioned by any of the techniques discussed above, for example as specified by block division rules. Element associator 410 associates elements of the watermarking key with respective selected blocks of the reference sequence. The elements may or may not be assigned to consecutive blocks of the watermarked sequence.

Embedding unit 420 then generates a watermarked sequence by shifting each of the selected blocks by a degree determined in accordance with a value of the respective element of the watermarking key. Embedding unit 420 may also perform signal processing, such as adjustment of samples at block edges, with the goal of reducing the distortion in the watermarked sequence.

All the data required for watermarking apparatus 400 to perform its task may be considered a watermarking protocol. As seen from the above discussion, the complexity of the watermarking protocol may vary greatly. For example, a simple watermarking protocol might specify: fixed block lengths, a binary watermarking key with constant shifts for '0' and '1', and no block edge adjustment or smoothing. More complex watermarking protocols may include varying block lengths and shifts, and signal analysis.

In the preferred embodiment watermarking apparatus 400 includes a database for storing the watermarking protocol. The watermarking protocol may include one or more of:

i. Block division rules, which define how the data sequence is divided into blocks;

ii. Offset rules, which assign degrees of shift to different values of the watermarking key elements;

iii. Edge adjustment rules, which define how the magnitudes of samples at the block edges are adjusted;

iv. Assignment rules, which define how elements of the watermarking key are assigned to data sequence blocks; and v. Signal specific auxiliary data, which may enable handling possible signal displacements during watermark extraction.

The watermarking protocol may be "built in" to watermarking apparatus 400, so that that the only external data required for watermarking a given data sequence is the watermarking key itself. This "built in" watermarking protocol may also be utilized for watermark extraction, as described below. In alternate embodiments all or parts of the watermarking protocol are input to watermarking apparatus 400 before a data sequence is watermarked.

Watermarking apparatus 400 may include signal processor 440 which generates the reference sequence from a source signal. The processing may include operations such as sampling, decoding, format conversion, channel separation, spectral decomposition, and other operations to bring the data sequence into the desired format before the watermark is embedded.

A reverse process is performed in order to extract the watermark from a watermarked sequence. The watermarked sequence S' is divided into blocks, where each block corresponds to a respective block of a reference sequence. The corresponding blocks are analyzed to determine the offset between them. The sequence of offsets is then translated into the watermarking key.

Watermark extraction typically requires knowledge of the protocol used for watermark embedding, such as block division rules and offset rules. When the protocol is fixed or predetermined, the extraction may not require external information to be provided. In other cases, watermark extraction may require external input, for example a transfer of watermarking protocol from the embedding process (or apparatus) to the extracting process (or apparatus).

Figure 5:
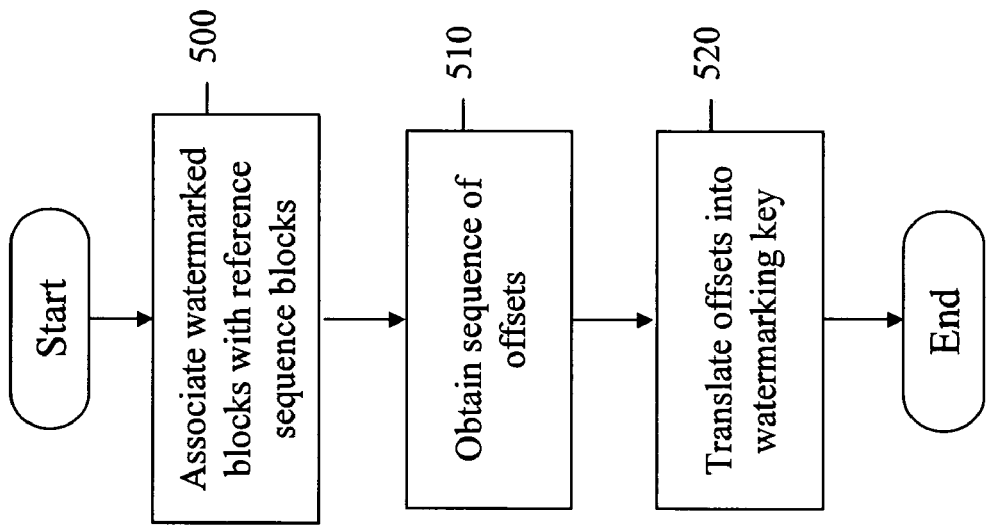
FIG. 5 is a simplified flowchart of a method for extracting a watermarking from a watermarked sequence, according to a preferred embodiment of the present invention.

Reference is now made to FIG. 5, which is a simplified flowchart of a method for extracting a watermarking from a watermarked sequence, according to a preferred embodiment of the present invention.

In 500, the blocks of samples of watermarked sequence S' are associated with respective blocks of the reference sequence.

For comparison purposes, both the watermarked sequence and the reference sequence are preferably in the same format. If the data sequence being examined is initially not in the same format as the reference sequence, some preprocessing may be required to yield a watermarked sequence S' which corresponds with the reference sequence format. For example the examined data sequence may be decompressed then down- or up-sampled to obtain the required format.

In order to position the block edges at the correct locations in the watermarked sequence, knowledge of the block division rules used during the embedding process may be required. In some embodiments the block length is constant, or is specified by a set of lengths $W'=(w'_1, w'_2, \ldots, w'_p)$. The set W' may be the same as the set $W=\{w_1, w_2, \ldots, w_p\}$ used for embedding. Alternately, the set W' may be modified due to changes in sequence formatting, such as sampling rate. In other embodiments, the watermarked sequence is analyzed to find the block edges, similarly to the analysis performed on the reference sequence in order to position the block edges.

In the preferred embodiment, the watermarked and reference sequences are synchronized prior to division into blocks. Synchronization helps to ensure that the blocks in the two data sequences are aligned with each other correctly. After synchronization the samples of the watermarked block and the reference sequence block may be considered aligned. The watermarked blocks may then be determined simply by counting the number of samples in each block.

In one embodiment, a specified segment of the reference sequence is not watermarked, for example a number of initial samples. The reference and watermarked sequences may then be more easily synchronized, by aligning the initial samples of both sequences.

In another embodiment, synchronization is performed by aligning identifiable and/or recurrent features in the two data sequences, such as drum beats, tonal and noised intervals, voiced and unvoiced intervals, zero crossing, spectral peaks, etc.

In another embodiment, proper synchronization may be achieved by utilizing auxiliary external data obtained from the watermarking protocol utilized during the embedding process.

In 510, a sequence of offsets, $O=\{O_1, O_2, \ldots, O_p\}$, is obtained by determining the relative location of a set of corresponding blocks of the watermarked and reference sequences. The blocks in the set may be consecutive or non-consecutive, in accordance with the watermarking protocol.

In the non-consecutive case, it may not be necessary to determine the offset between un-shifted blocks of the data sequences.

Two embodiments for determining the offset between corresponding blocks (by cross-correlation and by feature alignment) are described further below.

In 520, the sequence of offsets O is translated into a watermarking key. The translation is based on translation rules which may be considered to "reverse" the shifting process by which the watermarking key was embedded. Application of the translation rules to a sequence of offsets may be pre-specified, or may be derived from the offset rules used for watermark embedding.

In a first embodiment, the offset between two corresponding blocks is determined by identifying corresponding features within the watermarked and reference data signals. For example, when dealing with music signals it may be possible to locate corresponding beats and/or tempo of the music. The offset (in samples) between the location of the corresponding feature within the reference and watermarked sequences is then determined.

In a second embodiment, the offset between two corresponding blocks is determined using cross-correlation techniques. In order to determine an offset between a watermarked block and a reference sequence block, a cross-correlation is calculated between the two blocks. The offset which yields the peak cross-correlation between the watermarked block and the reference sequence block determines the offset to be used for extraction purposes. In a first exemplary embodiment, the cross-correlation between the watermarked block and the reference sequence block is calculated for a specified set of offsets, and the offset used for extraction purposes is identified from the specified set. In a second exemplary embodiment (shown below), a cross-correlation sequence is calculated for corresponding blocks of the watermarked and reference sequences, and the offset giving the peak value of the cross-correlation sequence is identified.

During the extraction process, a problem may arise if the cross-correlation peak value is not large enough (for example, if the peak of a normalized cross-correlation sequence is less than 0.5). In this case we may not be confident that the offset was found correctly. For example, if the watermarked signal is very distorted, then cross-correlation may not find any "similarity" between it and the reference signal, and the cross-correlation maximum values may be low. The cross-correlation results may therefore used as an indication whether the offset has been determined confidently or not.

In order to increase the confidence level of the watermark extraction process, in some embodiments the translation rules further include a cross-correlation threshold. If the cross-correlation results do not exceed the specified threshold the identification is considered unsuccessful.

In an exemplary embodiment of the cross-correlation method, the reference sequence S is divided into p sample blocks in the time domain, $S=\{B_1, B_2, \ldots, B_p\}$. If needed, the watermarked sequence S' is decompressed, then down/up-sampled to correspond the reference sequence format. Then the watermarked sequence is synchronized with the reference sequence as discussed above.

Next, the watermarked sequence S' is divided into p sample blocks in the time domain (similarly the watermarking process), $S'=\{B'_1, B'_2, \ldots, B'_p\}$.

Next, a cross-correlation sequence is calculated for corresponding blocks $B_i$ and $B'_i$. For $i=1, 2, \ldots, p$ the cross-correlation of $B_i$ and $B'_i$ is found as follows:

$$C_i(j) = \sum_{n=-\infty}^{\infty} B_i(n) B'_i(n-j),$$

$$j = 0, \pm 1, \pm 2, \ldots, \pm m_i.$$

Normalization of the sequence $C_i(j)$ provides an autocorrelation at a zero offset which is equal to one. Here $C_i(j)$ is normalized in order to obtain $C_i(0)=1$ for $B_i=B'_i$:

$$C'_i(j) = \frac{C_i(j)}{\sum_{n=-\infty}^{\infty} B_i^2(n)} \qquad (7)$$

The maximum of $C'_i(j)$ is selected:

$M_i = \max(C'_i(j))$,

The offset index $O_i$ is then determined as:

$O_i = j_0$ such that $C'_i(j_0) = M_i$.

The set $O=\{O_1, O_2, \ldots, O_p\}$ is the sequence of offsets of the corresponding blocks $B_i$ (reference sequence block) and $B'_i$ (watermarked block). The set $M=\{M_1, M_2, \ldots, M_p\}$ contains the maximums of the cross-correlation results between the corresponding blocks $B_i$ and $B'_i$.

The watermarking key is determined from $O=\{O_1, O_2, \ldots, O_p\}$. For example, the offsets may be translated by selecting a fixed threshold $0 \leq T \leq 1$ (e.g., T=0.5). If $M_i > T$, then the maximum of the cross-correlation is above the threshold, and:

if $O_i \geq 0$ and $r_1 R_i \leq O_i \geq r_2 R_i$ then $k_i = 1$,
if $O_i \leq 0$ and $l_1 L_i \geq |O_i| \geq l_2 L_i$ then $k_i = 0$,
for specified coefficients $r_1$, $r_2$, $l_1$, $l_2$ (e.g. $r_1 = l_1 = 0.5$, $r_2 = l_2 = 1.5$).

If $M_i \leq T$, the maximum of the cross-correlation is below the threshold, and the identification of the bit $k_i$ is considered unsuccessful.

Figure 6:
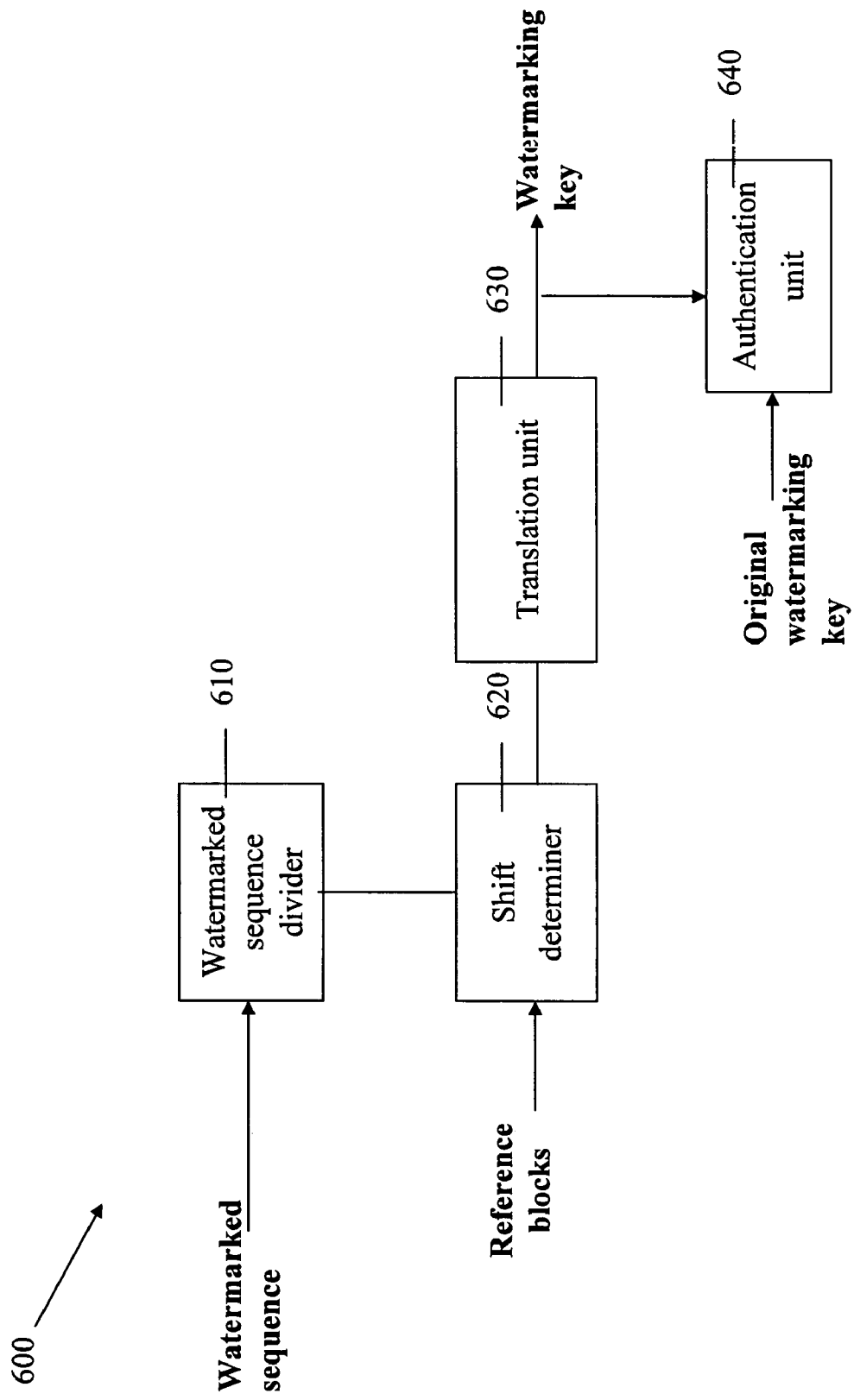
FIG. 6 is a simplified block diagram of a watermark extraction unit, according to a preferred embodiment of the present invention.

Reference is now made to FIG. 6, which is a simplified block diagram of a watermark extraction unit, according to a preferred embodiment of the present invention. Watermark extraction unit 600 extracts a watermarking key from a watermarked sequence as follows.

Watermarked sequence divider 610 apportions the watermarked sequence into watermarked blocks. The watermarked blocks correspond to respective blocks of a reference sequence. Offset determiner 620 determines a sequence of offsets between the two sequences, on a block by block basis. Translation unit 630 translates the sequence of offsets into the watermarking key.

In some embodiments, watermark extraction unit 600 includes authentication unit which compares the extracted watermarking key to an original watermarking key. The degree of match between the two keys is used to evaluate whether the watermarked sequence is a legitimate sequence.

In some embodiments, watermark extraction unit 600 further includes a processing unit for processing an input signal or sequence, in order to obtain the watermarked sequence and possibly the reference sequence (depending on the particular embodiment). For example, if the watermarking is performed on frequency sub-bands, the processing unit may perform the necessary filtering, separation and selection operations, so as to obtain the watermarked and un-watermarked carrier band sequences from the wideband sequence (as described above).

The authentication may be used in many contexts. These include:

Checking the legitimacy of a copy of a media sequence, such as a music or video clip.

Software authentication—For example, signal processing software may be authenticated by its manufacturer according to the watermarks contained in the output signal.

In some embodiments the watermarking key may be different for each copy of the signal, thereby providing individual identification data for each copy of the signal. For example, on-line music stores can use this technique to mark every sold track with the buyer ID, allowing later identification of the track buyer.

In another embodiment, the above-described watermarking and extraction may serve for the unique marking of audio devices (e.g. mobile phones, audio players, etc.). To illustrate, consider the situation where a mobile phone manufacturer wants to protect mobile phones from cloning. Mobile phones are generally cloned by manufacturing large numbers of copies of the phone, including the same chipsets and the same software. In order to prevent cloning, each phone is assigned a unique serial number in the factory. The phone includes software so that each phone continuously watermarks the audio signals using the above-described technique. The phone's unique serial number is used as the watermarking key.

In order to check if a number of phones are clones, a reference signal is obtained from each phone being tested (for example by calling the phone being tested). The output signals are recorded, and a respective watermarking key is extracted for each phone. Each watermarking key should be unique for each phone. If the tested phones were manufactured illegally (i.e. cloned) multiple phones will have the same watermarking key.

The embodiments presented above provide a watermarking technique, in which the watermarked data capacity may vary over a wide range, depending on particular implementation of the method and its target use. Generally, there is always a tradeoff between watermarked data capacity, watermark imperceptibility and watermark robustness. The proposed method is scalable as it enables creation of very robust schemes, schemes providing imperceptible encoding, schemes with large data capacity, and schemes providing a balance between these factors.

It is expected that during the life of a patent maturing from this application many relevant data sequences, signal formats, transducing techniques, transforming techniques, signal analysis techniques, data compression, encoding techniques, encryption techniques, source and media signals, signal processing techniques, and communication devices (such as mobile phones) will be developed and the scope of the corresponding terms is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and calculated support in the following examples.

EXAMPLES

Reference is now made to the following examples, which together with the above descriptions, illustrate some embodiments of the invention in a non limiting fashion.

The following examples were implemented in Mathworks' MathLab®, for both the watermarking embedding and extraction mechanisms.

The following examples were tested on a large number of different audio signals. The robustness of the watermarking scheme was checked by applying different kinds of distortions (e.g. multiple low bit-rate transcoding) to the watermarked signals. If the watermarking key was extracted successfully from the distorted/transduced/transcoded signals, then the scheme was considered robust. Imperceptibility was tested by several human listeners, who indicated if they heard differences between the un-watermarked and watermarked audio signals.

In a first example, the following, relatively simple, watermarking protocol was selected for a PCM signal S, with sampling rate of 44.1 KHz and sample resolution of 16 bits:

block length: $w_1, w_2, \ldots = w = 44100$ samples (1 second),
left offset: $L_1, L_2, \ldots = L = 500$ samples (approx. ⅛₈ of a second),
right offset: $R_1, R_2, \ldots = R = 0$ samples.

The above parameters permit the hiding of more than 60 bits of data in one minute of audio data, when embedding at a rate of one bit per one second of audio signal. The watermarking with the above parameters was found to be extremely robust to transcoding, transducing and effects processing. However, as the watermarking was applied to the full-band signal this watermarking may be perceptible to the human ear (as clicks and pops), if no further mechanisms are applied to smooth the transitions between shifted signal blocks.

In a second example, the following watermarking protocol was selected for 44.1 KHz/16 bit PCM signals:

block length: $w_1, w_2, \ldots = w = 11025$ samples (¼ of a second)
left offset: $L_1, L_2, \ldots = L = 150$ samples (1/294 of a second),
right offset: $R_1, R_2, \ldots = R = 0$ samples.

The above parameters allow hiding more than 240 bits of data in one minute of audio data, when embedding at a rate of one bit per one second of audio signal. The protocol provides a watermarking which is almost imperceptible by the human ear. The watermarking and extraction was found to be highly robust to transcoding (including sub-band psychoacoustic schemes).

The following two examples present another embodiment of the watermark embedding and extracting schemes.

The first example implements a blind watermarking scheme, and exploits the similarity of audio data in two channels of a stereo signal. This blind watermarking scheme does not require the source audio signal for watermark extraction.

For better results the scheme works in a number of frequency sub-bands (carrier bands) and not in the entire frequency band.

This implementation of the scheme:

Operates with stereo PCM files of 44.1 KHz/16 bit;

Input watermarking data is treated as sequence of symbols, each 3 bits long (i.e. integers from 0 to 7);

A Reed-Solomon algorithm is used to encode the watermarking data before its embedding into audio signal (this step was added to provide better data reliability by adding redundancy to the watermarking key).

Shows high robustness to signal time-shifting, cutting, sample rate conversion, re-quantization, and transcoding, e.g. watermark survives under multiple subsequent transcoding cycles using psychoacoustical sub-band coders.

In the present example, the stereo signal is separated into a right and a left channel. One of these channels, for example the right channel, is selected as the reference channel. Prior to watermarking both right and left channels are filtered to obtain carrier band signals.

First, the right and left carrier band signals are analyzed to determine which blocks will be watermarked. Preferably, the selected blocks are blocks having similarly valued samples, but carrying a sufficient amount of data (e.g. not silent intervals). In order to select the blocks, the signals are first subtracted to identify similar portions. Then the correlation between the signals at the identified portions is calculated, to determine the presence of data and its degree of similarity. The number of selected blocks should be sufficient to embed the watermarking key (e.g. 100 selected blocks for a 100-symbol watermarking key).

The sample values are averaged together in the selected blocks, to form a modified carrier band signal. The left channel is re-synthesized from the sub-band signals (including the modified carrier band signal). The modified carrier band signal in the right channel is watermarked, and the right channel is then synthesized from the sub-band signals.

This watermarking scheme ensures that the carrier band signals in both the right and left channels have a high degree of similarity, making it easier to determine the offsets correctly during the extraction process.

Watermark extraction requires a special private decoding key, which shows which portions of the data sequence were watermarked. The private key is generated for each particular source signal during watermark embedding. The private key is unique for the particular source signal, but does not depend on the specific watermarking key content if the length of the watermarking key does not change. In this particular implementation private key is stored as a text file containing sequence of integers. More compact implementations are possible. The use of a private key adds an additional layer of security to the watermarking process, since without the private key the extractor does not know which blocks of samples to examine.

The performance of the method was demonstrated on four stereo source audio signals (WAV PCM, 44.1 KHz, 16 bit, stereo, 50 seconds long each, 8820 Kbytes). Four watermarking keys were used:

WMKey1: 0 1 2 3 4 5 0 1 2 3 4 5 0 1 2 3 4 5 0 1 2 3 4 5 0 1 2 3 4 5 0 1 2 3 4 5 0 1 2 3 4 5

("0 1 2 3 4 5" repeated seven time, which is 42 symbols of 3 bits each=42*3 bits=126 bits of pure watermarking data. Resulting in 378 bits of total watermarking data after Reed-Solomon encoding.)

WMKey2: 7 0 3 4 1 6 7 0 3 4 1 6 7 0 3 4 1 6 7 0 3 4 1 6 7 0 3 4 1 6 7 0 3 4 1 6 7 0 3 4 1 6

("7 0 3 4 1 6" repeated seven time, which is 42 symbols of 3 bits each=42*3 bits=126 bits of pure watermarking data. Resulting in 378 bits of total watermarking data after Reed-Solomon encoding.)

WMKey3: 0 1 2 3 4 5 6 7 0 1 2 3 4 5 0 1 2 3 4 5 6 7 0 1 2 3 4 5 0 1 2 3 4 5 6 7 0 1 2 3 4 5 0 1 2 3 4 5 6 7 0 1 2 3 4 5

("0 1 2 3 4 5 6 7 0 1 2 3 4 5" repeated four times, which is 56 symbols of 3 bits each=56*3 bits=168 bits of pure watermarking data. Resulting in 504 bits total after Reed-Solomon encoding.)

WMKey4: 5 1 5 3 4 1 6 7 5 1 3 1 7 2 5 1 5 3 4 1 6 7 5 1 3 1 7 2 5 1 5 3 4 1 6 7 5 1 3 1 7 2 5 1 5 3 4 1 6 7 5 1 3 1 7 2

("5 1 5 3 4 1 6 7 5 1 3 1 7 2" repeated four times, which is 56 symbols of 3 bits each=56*3 bits=168 bits of pure watermarking data. Resulting in 504 bits total after Reed-Solomon encoding.)

WMKey5: 1 4 2 3 1 4 2 3 1 4 2 3 1 4 2 3 1 4 2 3 1 4 2 3 1 4 2 3

("1 4 2 3" repeated seven times, which is 28 symbols of 3 bits each=28*3 bits=84 bits of pure watermarking data. Resulting in 252 bits total after Reed-Solomon encoding.)

WMKey6: 1 5 1 2 4 7 2 2 1 3 1 4 1 2 4 2 3 1 2 3 2

(21 symbols of 3 bits each=63 bits of pure watermarking data with no iterations. Resulting in 189 bits total after Reed-Solomon encoding.)

Note that as WMKey1 and WMkey2 are of the same length, they will result in the same private key for each particular source signal. Similarly, WMKey3 and WMKey4 will result in the same private key for each particular source signal.

In order to demonstrate the robustness of the algorithm, each watermarked file was passed through a sequence of transcodings using MP3 and Ogg Vorbis. The exact transcoding scheme used was:

Source PCM wave file->MP3 256 Kbps->WAV->MP3 192 Kbps->WAV->MP3 192 Kbps->WAV->MP3 128 Kbps->WAV->MP3 128 Kbps->WAV->OGG 128 Kbps->PCM wave file.

Watermarking keys were successful extracted from the transcoded audio signals.

The present example was found to provide substantially imperceptible watermarking, with scalable data capacity (data capacity depends on the required reliability). The watermarking is robust to sample rate conversion, re-quantization and transcoding (including psychoacoustical algorithms such as MP3, OGG Vorbis, etc.). The watermarking is also robust to signal time-shifting and cutting. Depending on the particular implementation, the presence of a private key may also be required for watermark extraction.

Possible users of the above-described watermarking technique include:

Audio recording and production studios,

On-line music stores,

Broadcasting companies.

The second example implements a strict watermarking scheme which is a straightforward yet effective implementation of the above-described techniques. The scheme operates with audio signals having any number of channels (including mono signals). Source (unmodified) audio signal is required to extract the watermark.

Watermarking was performed on a carrier frequency band, as described above. During extraction, both the watermarked and source signals were filtered to obtain the carrier band signals. The carrier band signals were then analyzed to determine offsets between corresponding blocks.

This implementation of the scheme:

Requires source (unmodified) data to extract watermarking key;

The scheme was implemented on mono audio files (WAV PCM 44.1 KHz/16 bit). However, the scheme may be applied to audio data with any number of channels (including mono);

May be applied not only to original PCM data, but also to already compressed files such as MP3;

The input watermarking data was treated as sequence of symbols, each 3 bits long (i.e. integers from 0 to 7);

A Reed-Solomon algorithm was used to encode the watermarking data before its embedding into audio signal (this step was added to provide better reliability).

Was found to provides substantially imperceptible watermarking (even when signal division into blocks is not based on any signal analysis, i.e. irrespective to audio signal contents);

Simple implementation;

Fast watermarking allowing real-time processing, even on very low-power processors;

Robust to many kinds of transcoding, including: sample rate conversion, re-quantization, transcoding using extremely low bit rate psychoacoustic sub-band coders like MP3, WMA, Ogg Vorbis, etc.;

Robust to transducing (including audio transducing by air) and effects processing;

Provides scalable watermarking data capacity (data capacity depends on required reliability).

The source and watermarked audio signals were synchronized to allow correct watermark extraction. In order to synchronize the files, the watermark embedding utility produced a special "synchrocode" for each encoded file. The synchrocode is optional data produced during watermark embedding, for use by the watermark extraction utility. The watermark extraction utility uses the synchrocode data to synchronize the source and watermarked files properly while extracting the watermark. The synchrocode describes the spectral envelope of the original signal, and does not depend on watermarking data; it is unique for each encoded audio signal. In other implementations, if no synchrodata is passed to the extractor, other techniques are used to perform synchronization (e.g. as described above). In the present example, the synchrocode was generated by performing an FFT analysis of the original signal over overlapping windows, and summing the result over each window.

The performance of the method was demonstrated on four mono source audio signals (WAV PCM, 44.1 KHz, 16 bit, mono, 50 seconds long each, 4410 Kbytes). Two watermarking keys were used:

WMKey1: 0 1 2 3 4 0 1 2 3 4 0 1 2 3 4 0 1 2 3 4 0 1 2 3 4
("0 1 2 3 4" repeated 5 times, which is 25 symbols of 3 bits each=75 bits of pure watermarking data, and 210 bits of total watermarking data after Reed-Solomon encoding)

WMKey2: 0 1 2 3 4 5 6 7 0 1 0 1 2 3 4 5 6 7 0 1
("0 1 2 3 4 5 6 7 0 1" repeated twice, which is 20 symbols of 3 bits each=60 bits of pure watermarking data, and 168 bits total after Reed-Solomon encoding)

In order to demonstrate the robustness of the algorithm, each watermarked file was passed through a sequence of transcodings using MP3 and Ogg Vorbis. The exact transcoding scheme used was:

Source PCM wave file->OGG 64 Kbps->WAV->MP3 32 Kbps->WAV->OGG 64 Kbps->WAV->MP3 32 Kbps->WAV->OGG 64 Kbps->PCM wave file.

Watermarking keys were successfully extracted from the transcoded audio signals.

A watermarking key embedded using the strict watermarking scheme was successfully extracted from a watermarked audio signal recorded over air from an audio headphone.

Possible users of this watermarking technique include:

Audio recording and production studios having audio databases, on-line music stores, and broadcasting companies;

Manufacturers of audio reproduction software and hardware products. The method may be used in order to uniquely "mark" each individual copy of the audio product to allow its further identification.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for embedding a watermarking key into sequential data, comprising:
   obtaining a reference sequence from said sequential data;
   apportioning said reference sequence into blocks;
   associating elements of said watermarking key with respective blocks of said reference sequence; and
   generating a watermarked sequence from said reference sequence using a watermarking key, wherein said watermarking key comprises a specified sequence of elements and wherein each of said elements takes a value, by shifting said respective blocks of said reference sequence by a degree determined in accordance with a value of said respective associated element of said watermarking key, so as to embed said watermarking key into said sequential data.

2. A method for watermarking data in accordance with claim 1, wherein said associating and said generating are performed for a non-consecutive set of blocks.

3. A method for watermarking data in accordance with claim 1, further comprising selecting a degree of shift for a block in accordance with a value of said respective associated element.

4. A method for watermarking data in accordance with claim 1, wherein said apportioning is in accordance with block division rules specifying the division of said reference sequence into said blocks.

5. A method for watermarking data in accordance with claim 1, further comprising:
   analyzing said reference sequence to identify occurrences of a specified feature; and
   specifying respective lengths for said blocks in accordance with said occurrences.

6. A method for watermarking data in accordance with claim 1, further comprising adjusting a magnitude of overlapping samples of said watermarked sequence.

7. A method for watermarking data according to claim 1, further comprising obtaining said reference signal by sampling an analog source signal.

8. A method for watermarking data in accordance with claim 1, wherein said reference sequence comprises a media signal.

9. A method for watermarking data in accordance with claim 8, wherein said media signal consists of one of: an audio signal, an image, a sequence of images and a video signal.

10. A method for watermarking data in accordance with claim 1, comprising:
   separating a source signal by frequency band into a plurality of sub-band signals; and
   sampling one of said sub-band signals to obtain said reference sequence.

11. A method for watermarking data according to claim 1, further comprising:
   separating a source data sequence into a plurality of channel sequences; and
   selecting one of said channel sequences as said reference sequence.

12. A method according to claim 11, further comprising:
   separating said reference sequence by frequency band into a plurality of reference channel sub-band signals, wherein said watermarking key is embedded into a selected one of said reference channel sub-band signals.

13. A method according to claim 12, further comprising processing said reference sequence and a second one of said channel sequences to increase the similarity of said reference and said second channel sequences in a selected frequency sub-band.

14. A method for extracting a watermark from a watermarked sequence of sequential data, comprising:
   associating each of a sequence of watermarked blocks from said watermarked sequence with respective blocks of a reference sequence obtained from said sequential data;
   obtaining a sequence of offsets by determining, for each of a set of watermarked blocks, an offset between said watermarked block and said respective reference sequence block; and
   translating said sequence of offsets into a watermarking key.

15. A method according to claim 14, wherein said determining an offset between a watermarked block and a reference sequence block comprises identifying an offset which yields a peak cross-correlation between said watermarked block and said reference sequence block.

16. A method according to claim 14, wherein said determining an offset between a watermarked block and said respective reference sequence block comprises:
   locating a signal feature within said watermarked block;
   locating a corresponding signal feature within said respective reference sequence block; and
   calculating an offset between said locations.

17. A method according to claim 14, further comprising:
   separating a source data sequence into a plurality of channel sequences; and
   selecting one of said channel sequences as said reference sequence.

18. A method according to claim 14, further comprising:
   separating a source signal by frequency band into a plurality of sub-band signals; and
   sampling one of said sub-band signals to obtain said reference sequence.

19. A method according to claim 14, further comprising synchronizing said watermarked sequence and said reference sequence.

20. A method according to claim 14, wherein said translating comprises: for each offset within said sequence, determining a value of a corresponding element of said watermarking key in accordance with a magnitude of said offset.

21. A method according to claim 20, further comprising obtaining said reference sequence from a communication device.

22. A method according to claim 20, further comprising obtaining said reference sequence from a data signal processor.

23. A method according to claim 20, further comprising obtaining said reference sequence from a media data file.

24. A method according to claim 14, further comprising determining an authenticity of said watermarked sequence by comparing said extracted watermarking key to an original watermarking key.

25. A watermarking apparatus for embedding a watermarking key into a reference sequence obtained from sequential data, comprising:
   a reference sequence divider, configured for apportioning said reference sequence into blocks;
   an element associator associated with said reference sequence divider, configured for associating elements of said watermarking key with respective blocks of said reference sequence, wherein said watermarking key comprises a specified sequence of elements and wherein each of said elements takes a value; and
   an embedding unit associated with said element associator, configured for generating a watermarked sequence by shifting said associated blocks of said reference sequence by a degree determined in accordance with a value of said respective associated element of said watermarking key,
   thereby to embed said watermarking key into said reference sequence.

26. A watermarking apparatus according to claim 25, wherein said reference sequence is obtained from a communication device.

27. A watermarking apparatus according to claim 25, wherein said reference sequence is obtained from a data signal processor.

28. A watermarking apparatus according to claim 25, wherein said reference sequence is obtained from a media data file.

29. A watermarking apparatus according to claim 25, further comprising a database associated with said embedding unit, configured for storing a watermarking protocol, said watermarking protocol comprises at least one of:
   i. Block division rules for defining a manner for dividing said reference sequence into blocks;
   ii. Offset rules for defining a manner for assigning degrees of shift degrees to watermarking key elements;
   iii. Edge adjustment rules for defining a manner for adjusting magnitudes of overlapping samples of a watermarked sequence; and
   iv. Assignment rules for defining a manner for assigning elements of said watermarking key to reference sequence blocks.

30. A watermarking apparatus according to claim 25, further comprising an original signal processor associated with said reference sequence divider, and configured for sampling a source signal and processing said samples into said reference sequence.

31. A watermark extraction unit for extracting a watermarking key from a watermarked sequence, comprising:
  a watermarked sequence divider, configured for apportioning a watermarked sequence into watermarked blocks corresponding to respective blocks of a reference sequence;
  an offset determiner associated with said watermarked sequence divider, configured for obtaining a sequence of offsets by determining, for each of a set of watermarked blocks, an offset between said watermarked block and said respective reference sequence block; and
  a translation unit associated with said offset determiner, configured for translating said sequence of offsets into said watermarking key.

32. A watermark extraction unit according to claim 31, further comprising an authentication unit associated with said offset determiner, configured for determining an authenticity of said watermarked sequence by comparing said extracted watermarking key to an original watermarking key.

* * * * *